Figure 1:
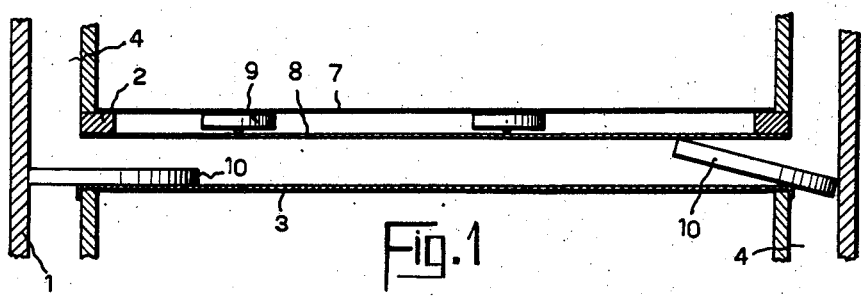

April 14, 1964     P. EPPENBERGER     3,129,168

CLEARING PLATE FOR SIFTER BOTTOM

Filed July 6, 1961

INVENTOR:
PAUL EPPENBERGER
BY McGlew and Toren
ATTORNEYS

United States Patent Office 3,129,168
Patented Apr. 14, 1964

3,129,168
CLEARING PLATE FOR SIFTER BOTTOM
Paul Eppenberger, Auenhofen, Amriswil, Switzerland, assignor to Gebrueder Buehler, Uzwil, Switzerland, a firm of Switzerland
Filed July 6, 1961, Ser. No. 122,323
Claims priority, application Switzerland July 6, 1960
4 Claims. (Cl. 209—379)

Various systems have been used so far for clearing sifter bottoms, in particular collecting bottoms of plansifters. When using rings made of plastic, the center opening tends to become clogged with goods, and the clearing action is rather weak on account of the high friction encountered. On the other hand, round or rectangular discs, made for example of plastic or leather, have a good clearing action. On account of their relatively great mass, however, pronounced blows or strokes occur against the sifter walls, which is undesirable from the point of view of wear. When using a large number of such discs, a considerable noise may arise.

The present invention shows means for avoiding said disadvantages. The sifter-bottom clearing plate disclosed herein is characterized by recesses or slots disposed close to its periphery. This ensures that disc in use will be subjected to bending stresses close to its rim, which leads to a certain resilience and a decrease of shock and impact.

In further developing the idea underlying the invention, the end of one slot is staggered with respect to the beginning of the other slot and extended beyond same. Thus, there is no direct transfer of impact from the rim to the main mass of the plate since there is a flexure in any case.

A particular form of the clearing-plate rim ensures that the plate travels over the entire area to be cleared.

The cross-section of the slots is chosen such that when the disc hits the wall, the goods falling-through will rebound upwardly and then may be discharged.

Two forms of the invention, together with a few explanatory sketches, are shown in the drawing.

Figure 2:
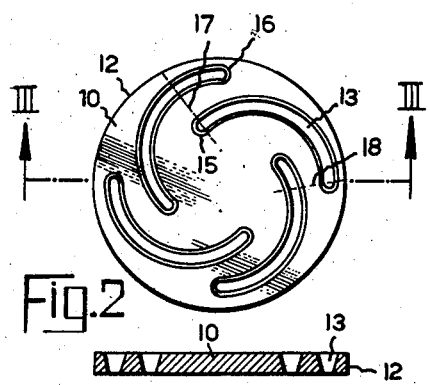
Figure 3:
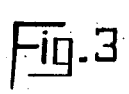
Figure 4:
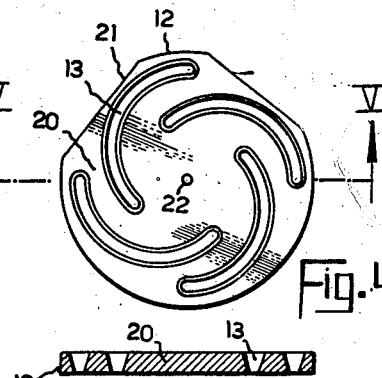
Figure 5:
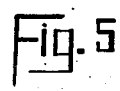
Figure 6:
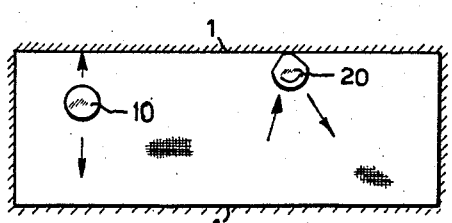
Figure 7:
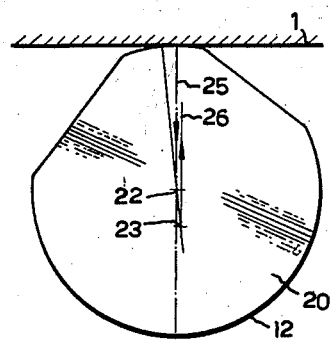

FIG. 1 is a section through a sifter stage of a plansifter compartment,

FIG. 2 is a plan view of a first example of the clearing plate according to the invention, FIG. 3 is a section on the line III—III of FIG. 2, FIG. 4 shows a plan view of a second example of the clearing plate, FIG. 5 is a section on the line V—V of FIG. 4, FIG. 6 illustrates schematically a comparison of the runs made by plates according to the two examples, and FIG. 7 shows schematically the forces arising when a plate of the second example impinges against the plansifter wall.

Between the walls 1 of a plansifter (FIG. 1) are arranged sifter frames 2 and collecting bottoms 3 which, together with the walls 1, define lateral discharge ducts 4. Sifter frame 2 is provided with a sifter cloth 7 and a subjacent coarse wire-mesh 8 which carries pieces of belting 9 for clearing the cloth 7. On and across the collecting bottom 3 travel or roam clearing plates 10 with a diameter such that they cannot tilt into the discharge ducts 4.

The goods to be sifted travel on sifter cloth 7 in a direction at right angles to the plane of the drawing. The fraction falling through cloth 7 also passes through wire-mesh 8 on to the collecting bottom 3 and is laterally discharged to a further sifting stage through the discharge ducts 4. Owing to the movement of the plansifter, the pieces of belting 9 travel between wire-mesh 8 and cloth 7 and keep open the perforations of the latter. The clearing plates 10, on the other hand travel on the collecting bottom 3 and assist the movement of the goods.

Clearing plate 10, as shown in FIGS. 2 and 3, adjacent to its circular rim 12 comprises a plurality of slots 13 of tapered cross-section. The end 15 of a slot 13 is staggered with respect to the beginning 16 of the next slot and is extended beyond same. When disc 10 impinges against wall 1, such impact causes a bending of the disc between the sections 17 and 18. If the slots 13 were disposed merely one after another, webs would be left between same which in certain cases would allow of transmitting the impact to the main disc mass, in which case there would not be any resilience. The tapered cross-section of the slots 13 causes the passing goods, when impinging against the wall, to be thrown back upwardly by the sudden deformation of the slots, and such cross-section thus prevents slots 13 from becoming clogged. In certain cases, however, the walls of the slots 13 could be made vertical.

The clearing plate 20 of the second example (FIGS. 4 and 5) is similar to plate 10 of the first form, but its circular rim 12 is interrupted by cuts 21 along chords which are arranged unsymmetrically with respect to the center 22. This irregular form and shape of disc 20 is explained below with reference to FIGS. 6 and 7.

As the rim of plate 10 of the first example is symmetric, it is possible under certain conditions that the disc travels back and forth between the walls 1, reversing its movement but not substantially changing its direction of movement, as best seen in FIG. 6 which schematically illustrates the paths of movement of the plates 10 and 20. Thus for an extended time, one range only of the area to be cleared is swept. In the plate 20 of the second example, however, the center of gravity 23 is staggered with respect to the center of the circular portion of rim 12. Even when plate 20 travels towards wall 1 at right angles thereto, it will practically always occupy a skew position. The force 25 (FIG. 7) exerted by wall 1 on plate 20 and the inertia 26 acting on the center of gravity, are not unidirectional. For this reason, the resulting force is unbalanced or in the form of a turning moment which causes plate 20 to change its direction of movement or to undergo a partial rotation.

I claim:

1. A sifter-bottom clearing plate comprising a freely movable and unattached substantially flat disc of flexible material, said disc being interrupted at its periphery by chordal portions which are disposed asymmetrically with respect to the center of the disc, said disc being imperforate except for a series of longitudinally curved and relatively narrow slots each starting at an outer end adjacent the disc periphery and terminating at an inner end spaced inwardly from the disc periphery, the inner end of each slot overlapping longitudinally and being spaced inwardly of the outer end of the adjacent slot.

2. A sifter-bottom clearing plate comprising a substantially freely movable and unattached substantially flat disc of flexible material having at least a portion of its periphery curvilinear, and with the periphery being asymmetrical with respect to the center of the disc, said disc being imperforate except for a series of longitudinally curved and relatively narrow slots each starting at an outer end adjacent the disc periphery and terminating at an inner end spaced inwardly from the disc periphery, the inner end of each slot overlapping longitudinally and being spaced inwardly of the outer end of the adjacent slot.

3. A sifter-bottom clearing plate comprising a freely movable and unattached substantially flat disc of flexible material having at least a portion of its periphery curvilinear, said disc being imperforate except for a series of longitudinally curved and relatively narrow slots each starting at an outer end adjacent the disc periphery and terminating at an inner end spaced inwardly from the disc periphery, said slots decreasing in width from the first surface of said disc to the opposite surface thereof, the inner end of each slot overlapping longitudinally and being spaced inwardly of the outer end of the adjacent slot.

4. A sifter-bottom clearing plate comprising a freely movable and unattached substantially flat disc of flexible material having at least a portion of its periphery curvilinear, said disc being imperforate except for a series of longitudinally curved and relatively narrow slots each starting at an outer end adjacent the disc periphery and terminating at an inner end spaced inwardly from the periphery, said inner end of each slot overlapping longitudinally and being spaced inwardly of the outer end of the adjacent slot.

References Cited in the file of this patent

UNITED STATES PATENTS

| | | |
|---|---|---|
| 2,304,325 | Williams | Dec. 8, 1942 |
| 2,913,115 | Szegvari | Nov. 17, 1959 |

FOREIGN PATENTS

| | | |
|---|---|---|
| 16,165 | Great Britain | July 11, 1895 |
| 411,203 | Italy | July 19, 1945 |
| 708,719 | Great Britain | May 12, 1954 |
| 200,424 | Austria | Apr. 15, 1958 |